United States Patent [19]
Shibata

[11] Patent Number: 5,977,821
[45] Date of Patent: Nov. 2, 1999

[54] DIGITAL DETECTION METHOD AND CIRCUIT FOR PSK MODULATED SIGNALS

[75] Inventor: Manabu Shibata, Sendai, Japan

[73] Assignee: Fujitsu Limited, Kanagawa, Japan

[21] Appl. No.: 09/052,091

[22] Filed: Mar. 31, 1998

[30] Foreign Application Priority Data

Oct. 20, 1997 [JP] Japan ................................. 9-287345

[51] Int. Cl.[6] .................................................. H04L 27/22
[52] U.S. Cl. ...................... 329/306; 329/310; 375/326; 375/328; 375/329
[58] Field of Search ..................... 329/304, 306, 329/310; 375/324, 326, 328, 329, 332, 340

[56] References Cited

U.S. PATENT DOCUMENTS

| | | | |
|---|---|---|---|
| 4,773,083 | 9/1988 | Baumbach et al. | 375/328 |
| 5,295,162 | 3/1994 | Zarembowitch | 329/304 |

*Primary Examiner*—Siegfried H. Grimm
*Attorney, Agent, or Firm*—Helfgott & Karas, P.C.

[57] ABSTRACT

In a digital radio communication apparatus which receives PSK modulated signal, a plurality of items of quantized data are sampled at a plurality of points including a central point, which corresponds to one of each rising edge or each decaying edge of a reproduction clock signal, points before the central point and points after the central point. The sampled plurality of items of quantized data are combined so that combined phase data is obtained for each symbol.

18 Claims, 13 Drawing Sheets

DIGITAL DETECTION METHOD AND CIRCUIT FOR PSK MODULATED SIGNALS

BACKGROUND OF THE INVENTION

1. Field of the Invention

The present invention relates to a detection method of a digital radio communication apparatus and a circuit thereof, and, in particular, to a detection method of a digital radio communication apparatus, which receives a PSK (Phase Shift Keying) modulated signal, and a circuit thereof.

2. Descriptions of the Related Art

FIG. 1 shows a block diagram of an example of a detection circuit of a digital radio communication apparatus in the related art. In the figure, for example, an intermediate frequency (IF) signal of a PSK modulated signal, which the digital radio communication apparatus has received, is supplied to a quantization circuit 11 via a terminal 10. The quantization circuit 11 quantizes the phases of the intermediate frequency signal and supplies, to a sampling circuit 12, quantized phase data, shown in FIG. 2A, obtained from quantization of the phases of the received intermediate frequency signal. To the sampling circuit, a reproduction clock signal shown in FIG. 2B is also supplied from a PLL (Phase Locked Loop) 13. The sampling circuit 12 samples the quantized phase data at each rising edge of the reproduction clock signal, and supplies, to the PLL 13 and a data determination circuit 14, the sampled quantized phase data, shown in FIG. 2C.

The PLL 13 generates the reproduction clock signal which is in synchronization with the sampled quantized phase data. The data determination circuit 14 determines data of a plurality of bits, from the sampled phase quantized data, in accordance with the phase, thus, performing PSK demodulation (or detection), and outputs thus-obtained data via a terminal 15.

In this circuit in the related art, the quantized phase data is sampled at one sampling point during each period of the reproduction clock signal, and the sampled quantized phase data is used for the data determination. Therefore, when a sudden phase deviation occurs at a sampling point, the data determination may be erroneously performed.

Further, in a method in which a limiter is provided at a preceding stage so that the amplitudes are limited and only the phases are used for reproduction, the opening point of each eye pattern is narrow in comparison to the case where the limiter is not provided. Therefore, each sampling point determined by the reproduction clock signal should be strictly determined. When a sampling point deviates even a small amount forward or backward, good detection cannot be performed. Further, due to an insufficient receiving ability of the digital radio communication apparatus or spurious interference occurring inside the apparatus, the eye pattern is blurry. Thereby, good detection cannot be performed, and data determination may be erroneously performed.

SUMMARY OF THE INVENTION

The present invention has been devised in view of the above-mentioned points, and an object of the present invention is to provide a detection method of a digital radio communication apparatus and a circuit thereof in which there is no possibility that data determination is erroneously performed.

A detection method of a digital radio communication apparatus, which receives a PSK modulated signal, according to the present invention, comprises the steps of:

a) combining a plurality of items of quantized data (sampled) with respect to a timing defined by a reproduced clock signal so that combined phase data can be generated for each symbol; and b) determining data from the combined phase data.

Thereby, in a case where a sudden phase deviation occurs at one sampling point, or a case where the eye pattern is blurry, phase data with a small error can be obtained. Thereby, the number of errors occurring in the data determination can be reduced.

The plurality of items of quantized data with respect to the timing defined by the reproduced clock signal may be a plurality of items of quantized data sampled in discrete timings of the periods of the PSK modulated signal. Thereby, in a case where a sudden phase deviation occurs at one sampling point, occurrence of erroneous data determination can be prevented.

The step a) may be performed by detecting the phase difference between two adjacent items of the plurality of items of quantized data and performing vector combination using the detected phase difference. Thereby, the phase data of each symbol can be obtained from combining the plurality of items of quantized phase data by simple calculations.

The step a) may be performed by averaging the plurality of items of quantized data after weighting the plurality of items of quantized data so that the weight put on the item of quantized data is reduced as the timing thereof is spaced from the timing defined by the reproduced clock signal. Thereby, the phase data of each symbol can be obtained from combining the plurality of items of quantized data by simple calculations.

The step a) may be performed by determining, as the combined phase data, the item of the quantized data of the plurality of items of the quantized data, which occurs most frequently. Thereby, the phase data of each symbol can be easily obtained from combining the plurality of items of quantized data. In particular, in a case where a sudden phase deviation occurs at one sampling point, occurrence of erroneous data determination can be prevented.

The step a) may be performed by averaging the sampled plurality of items of quantized data after weighting the plurality of items of quantized data so that the weight put on the item of quantized data is reduced as the timing thereof is spaced from the timing defined by the reproduced clock signal, when the plurality of items of quantized data includes a plurality of items of different quantized data, each of which occurs most frequently. Thereby, the phase data of each symbol can be easily obtained from combining the plurality of items of quantized data. Further, when the plurality of items of quantized data includes a plurality of items of different quantized data, each of which occurs most frequently, the phase data of each symbol can be easily obtained from combining the plurality of items of quantized data.

Other objects and further features of the present invention will become more apparent from the following detailed description when read in conjunction with the accompanying drawings.

DETAILED DESCRIPTION OF EMBODIMENT

Figure 1:
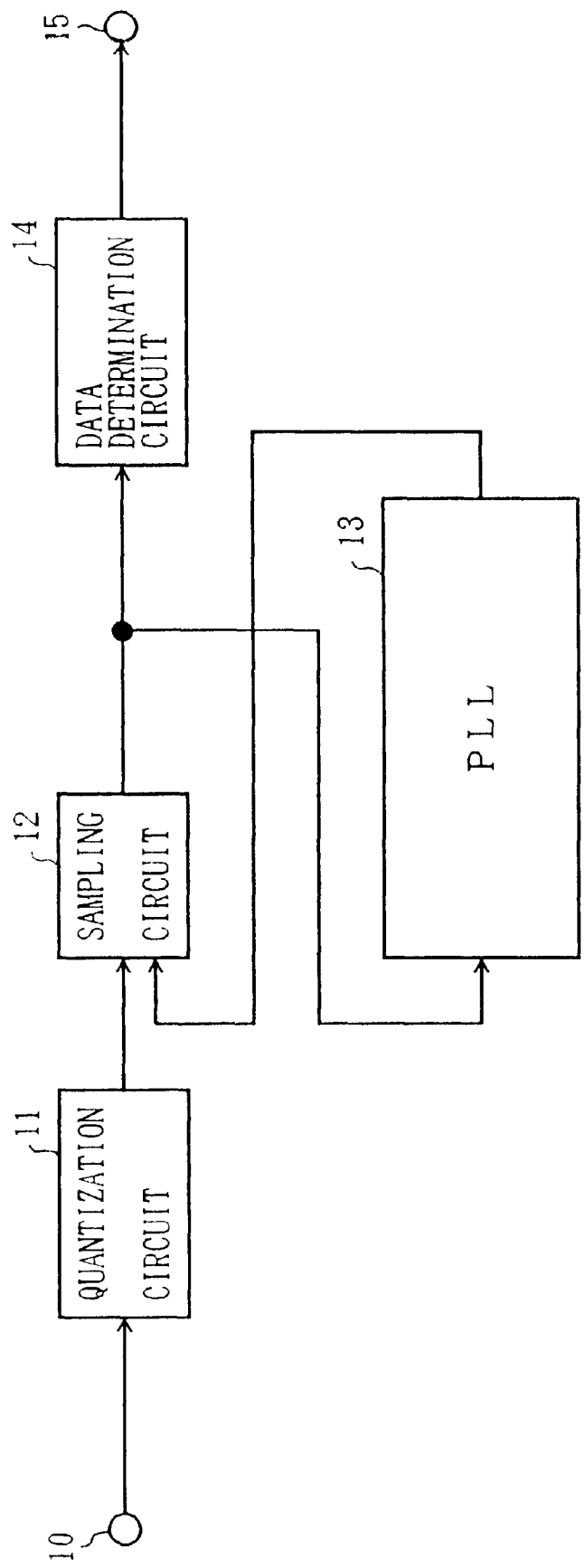
FIG. 1 shows a block diagram of one example of a detection circuit of a digital radio communication apparatus in the related art.
Figure 2:
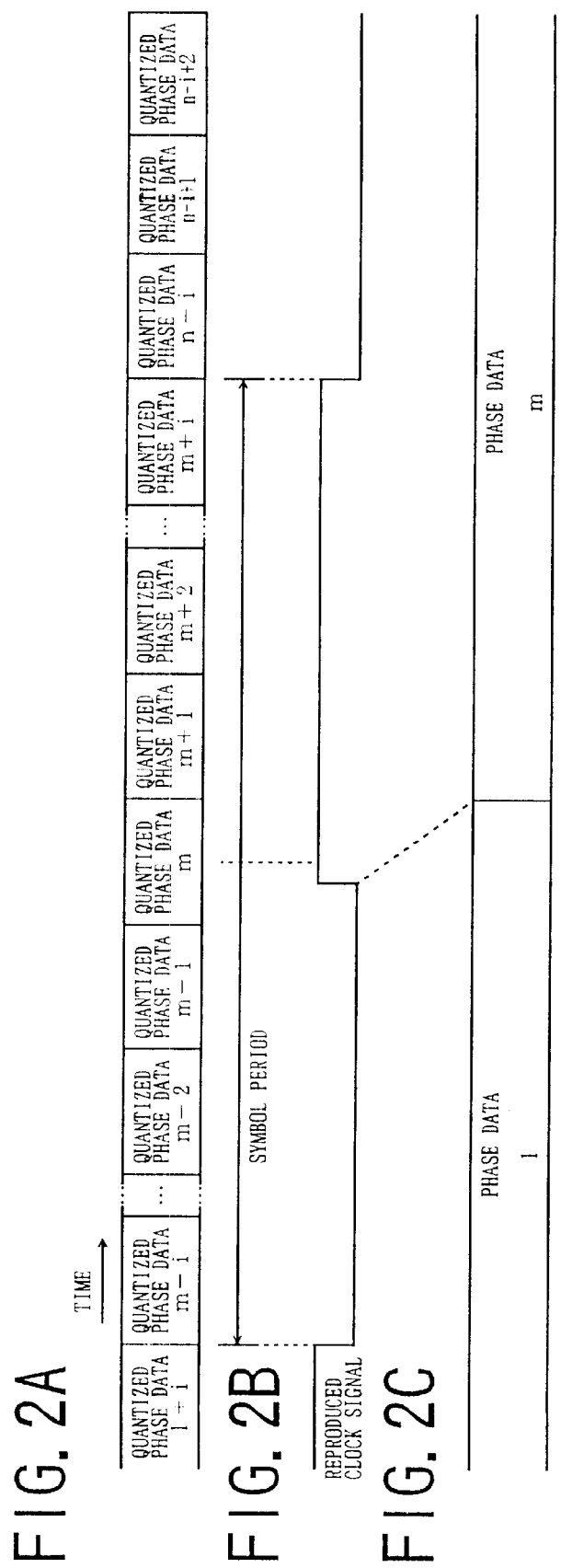
FIGS. 2A, 2B and 2C show timing charts of signals in the detection circuit in the related art.
Figure 3:
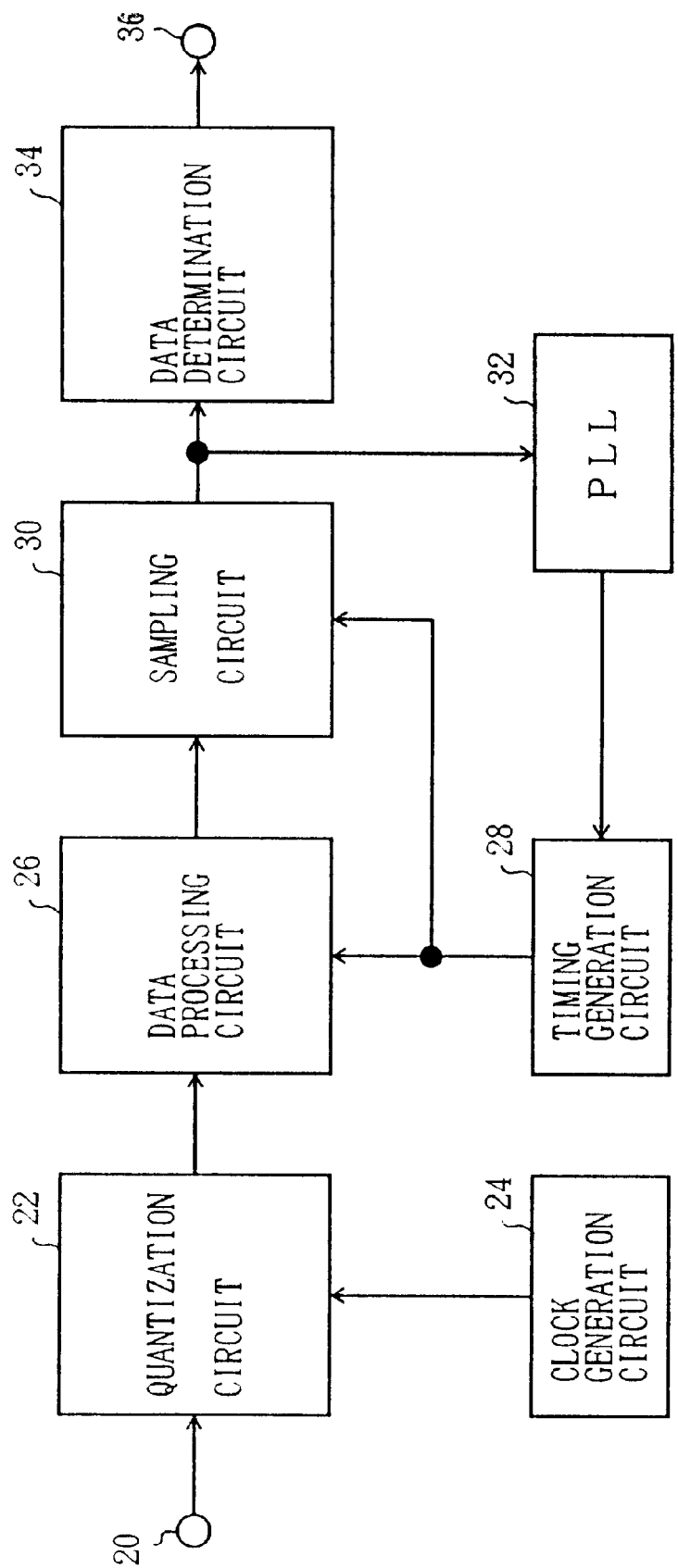
FIG. 3 shows one embodiment of a block diagram of a detection circuit of a digital radio communication apparatus according to the present invention.

FIG. 3 shows a block diagram of a detection circuit of a digital radio communication apparatus in an embodiment of the present invention. In the figure, for example, an intermediate frequency (IF) signal of a PSK signal, which the digital radio communication apparatus has received, is supplied to a quantization circuit 22 via a terminal 20. The quantization circuit 22 quantizes the intermediate frequency signal, using a high-speed clock signal supplied from a clock signal generation circuit 24, obtains quantized phase data, shown in FIG. 4A, and supplies, to a data processing circuit (combining means) 26, the quantized phase data in time series.

Figure 4:
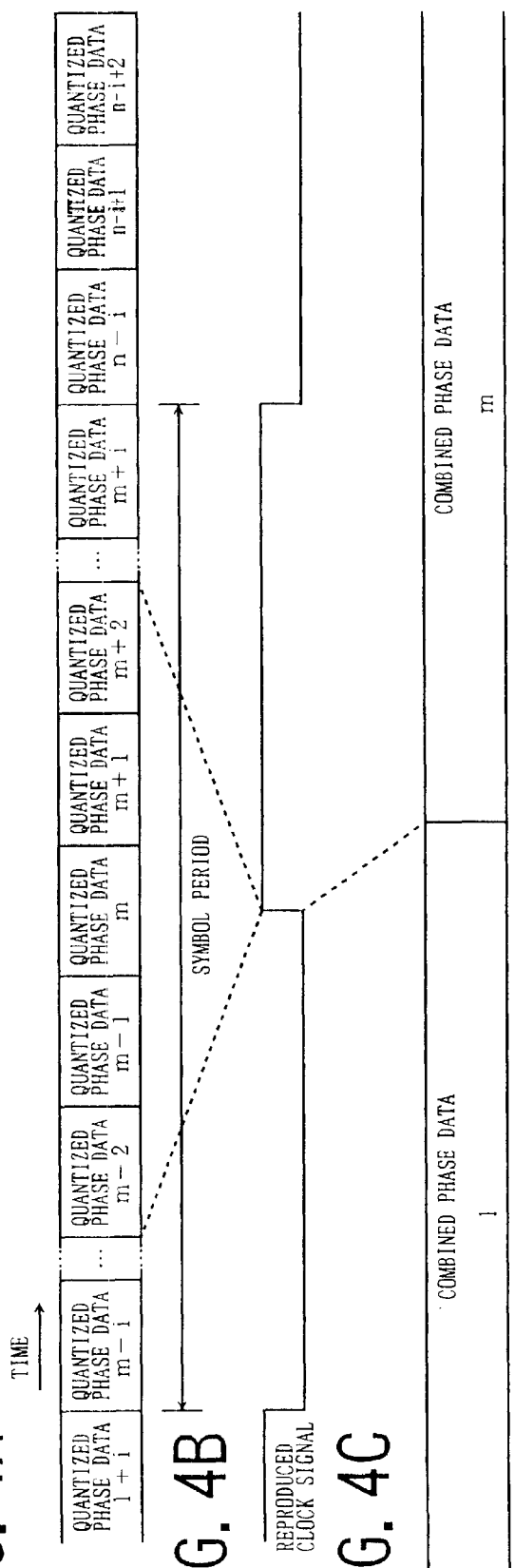
FIGS. 4A, 4B and 4C show timing charts of signals in the detection circuit in the detection circuit shown in FIG. 3.

The data processing circuit 26 combines a plurality of items of the quantized phase data m−2, m−1, m, m+1 and m+2, which are taken from the supplied quantized phase data in time series. That is, the data processing circuit 26 determines the quantized phase data m at the time of each rising edge of the reproduction clock signal as the central quantized phase data, and takes the central quantized phase data m, a certain number of items of the quantized phase data m+1, m+2 forward of the central quantized phase data m and a certain number of items of the quantized phase data m−1, m−2 backward of the central quantized phase data m and combines the thus-taken data so as to generate combined phase data m. The combined phase data m, shown in FIG. 4C, is supplied to a sampling circuit 30. A timing generation circuit 28 generates two timing signals and supplies the timing signals to the data processing circuit 26 and the sampling circuit 30, respectively. The sampling circuit 30 latches the combined phase data using the timing signal of the symbol clock frequency supplied from the timing generation circuit 28, and supplies the latched combined phase data to a PLL 32 and a data determination circuit 34.

The PLL 32 generates the reproduction clock signal of the symbol clock frequency, shown in FIG. 4B, in synchronization with the sampled combined phase data, and supplies the reproduction clock signal to the timing generation circuit 28. The timing generation circuit 28 generates the two timing signals based on the supplied reproduction signal. The data determination circuit 34 determines data of a plurality of bits, from the sampled combined phase data, in accordance with the phase, thus, performs PSK demodulation (or detection), and outputs thus-obtained data via a terminal 36.

The symbol clock frequency of the PSK, that is, the frequency of the reproduction clock signal, is, for example, 21 kHz. The frequency of the intermediate frequency signal is, for example, 450 kHz. The quantization frequency is, for example, 14.4 MHz.

Figure 5:
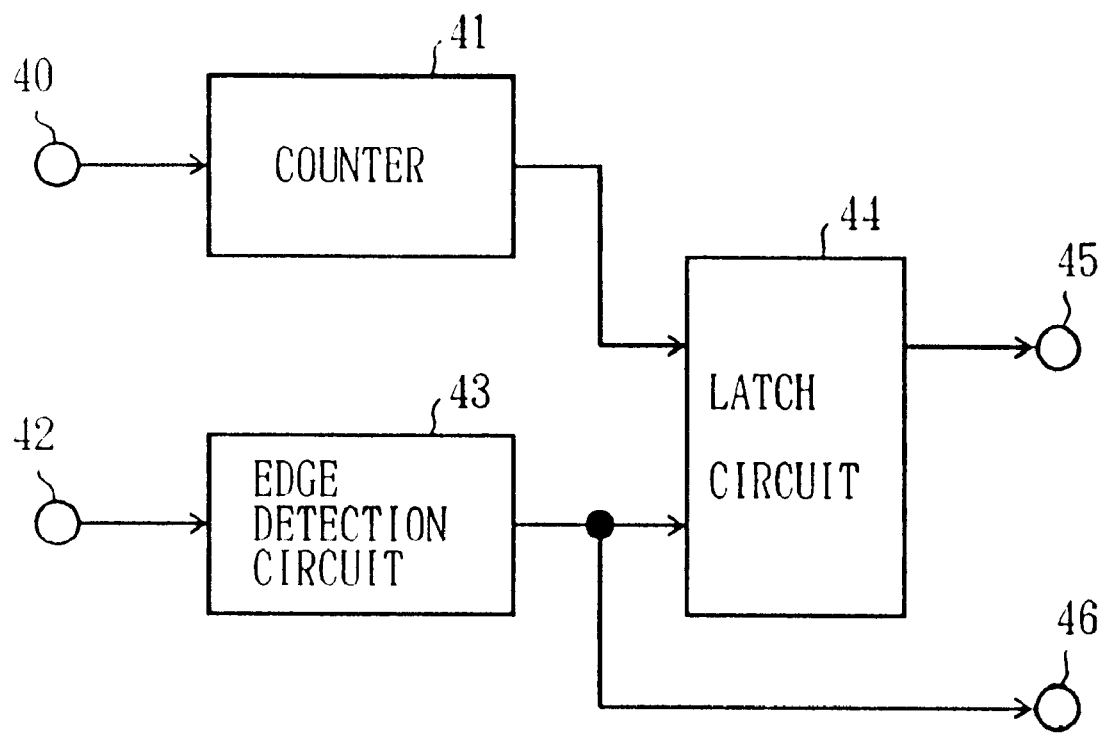
FIG. 5 shows a block diagram of one embodiment of a quantization circuit used in the circuit shown in FIG. 3.

FIG. 5 shows a block diagram of one embodiment of the quantization circuit 22. In the figure, a clock signal having a frequency of, for example, 14.4 MHz is supplied to a counter 41 via a terminal 40. The counter counts the pulses of this clock signal, and supplies the resulting count values to a latch circuit 44. An edge detection circuit 43 detects each rising edge of the intermediate frequency signal, supplied via a terminal 42, and supplies an edge detection signal to the latch circuit 44. The latch circuit 44 latches the count value, supplied from the counter 41, as the quantized phase data, when the edge detection signal is supplied thereto, and outputs the quantized phase data via a terminal 45.

Figure 6:
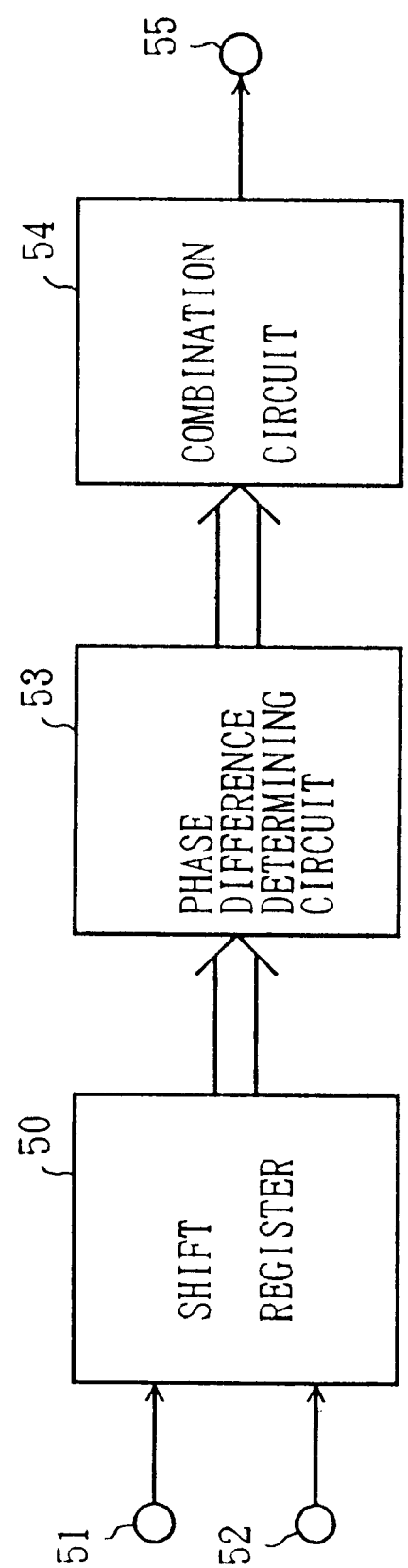
FIG. 6 shows a general block diagram of a data processing circuit, in a first system, which may be used in the circuit shown in FIG. 3.
Figure 7:
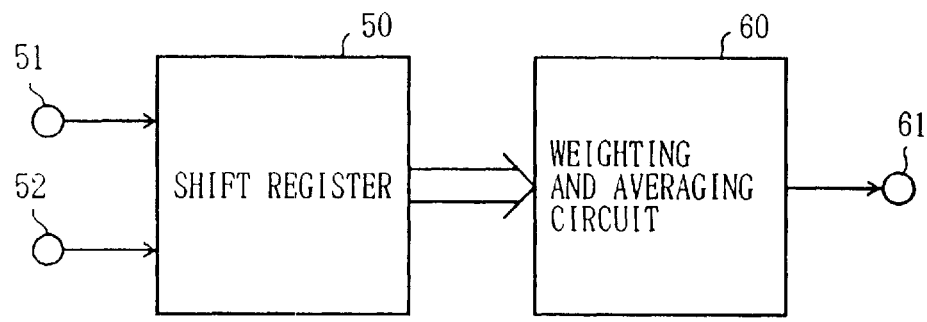
FIG. 7 shows a general block diagram of the data processing circuit, in a second system, which may be used in the circuit shown in FIG. 3.
Figure 8:
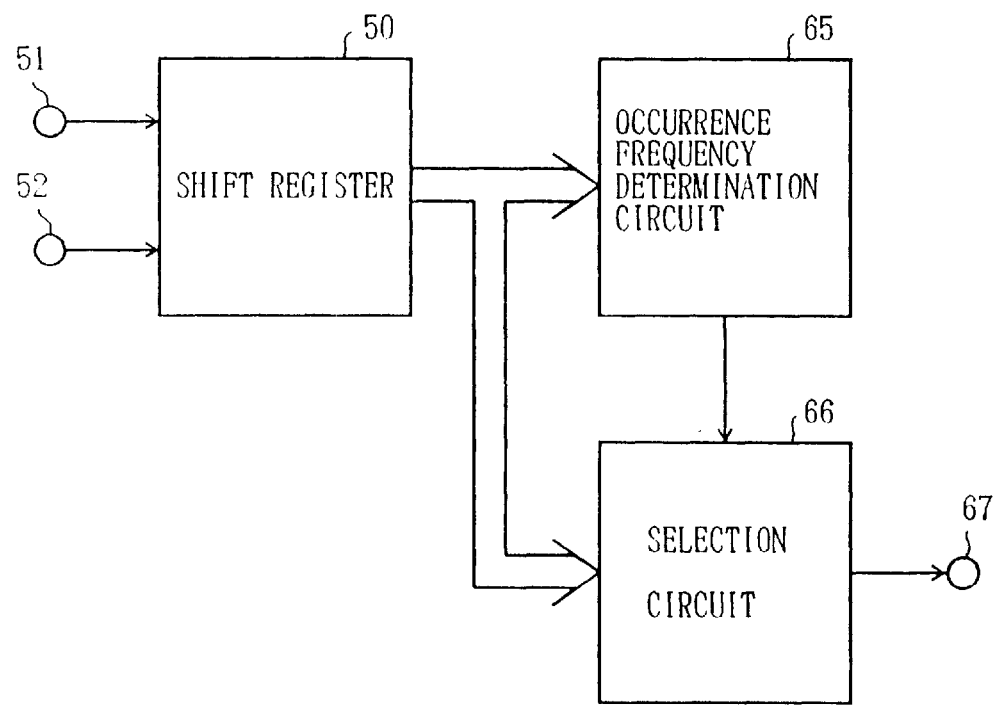
FIG. 8 shows a general block diagram of the data processing circuit, in a third system, which may be used in the circuit shown in FIG. 3.

The data processing circuit 25 has any of the arrangements shown in FIG. 6, FIG. 7 and FIG. 8. FIG. 6 shows a general block diagram of the data processing circuit 26 in a first system. In FIG. 6, the quantized phase data, input via a terminal 51, and the timing signal, supplied from the timing generation circuit 28 and input via a terminal 52, are supplied to a shift register 50, and the supplied quantized phase data is shifted in the shift register 50. The quantized phase data, output from each stage of the shift register 50, is supplied to a phase difference detection circuit (phase difference detecting means) 53, and the phase difference of each quantized phase data is detected by the phase detection circuit 53. The data of these phase differences is supplied to a combination circuit (vector combining means) 54. The combination circuit 54 performs vector combination and supplies the combined phase data, which is output via a terminal 55.

FIG. 7 shows a general block diagram of the data processing circuit 26 in a second system. In FIG. 7, the quantized phase data, input via a terminal 51, and the timing signal, supplied from the timing generation circuit 28 and input via a terminal 52, are supplied to a shift register 50, and the supplied quantized phase data is shifted in the shift register 50. The quantized phase data, output from each stage of the shift register 50, is supplied to a weighting and averaging circuit (weighting and averaging means) 60. The weighting and averaging circuit 60 calculates a weighted and averaged value of the supplied respective quantized phase data, and the weighted and averaged value is output via a terminal 61, as the combined phase data.

FIG. 8 shows a general block diagram of the data processing circuit 26 in a third system. In FIG. 8, the quantized phase data, input via a terminal 51, and the timing signal, supplied from the timing generation circuit 28 and input via a terminal 52, are supplied to a shift register 50, and the supplied quantized phase data is shifted in the shift register 50. The quantized phase data, output from each stage of the shift register 50, is supplied to an occurrence frequency determination circuit 65 (occurrence frequency determining means) and a selection circuit 66. The occurrence frequency determination circuit 65 detects the quantized phase data, the frequency of occurrences thereof being the highest, from the supplied respective quantized phase data, and supplies a control signal to the selection circuit 66, the control signal indicating that the thus-detected quantized phase data is to be selected. Thereby, the selection circuit 66 selects the quantized phase data, the frequency of occurrences thereof being the highest, and the thus-selected quantized phase data is output via a terminal 67, as the combined phase data.

Figure 9:
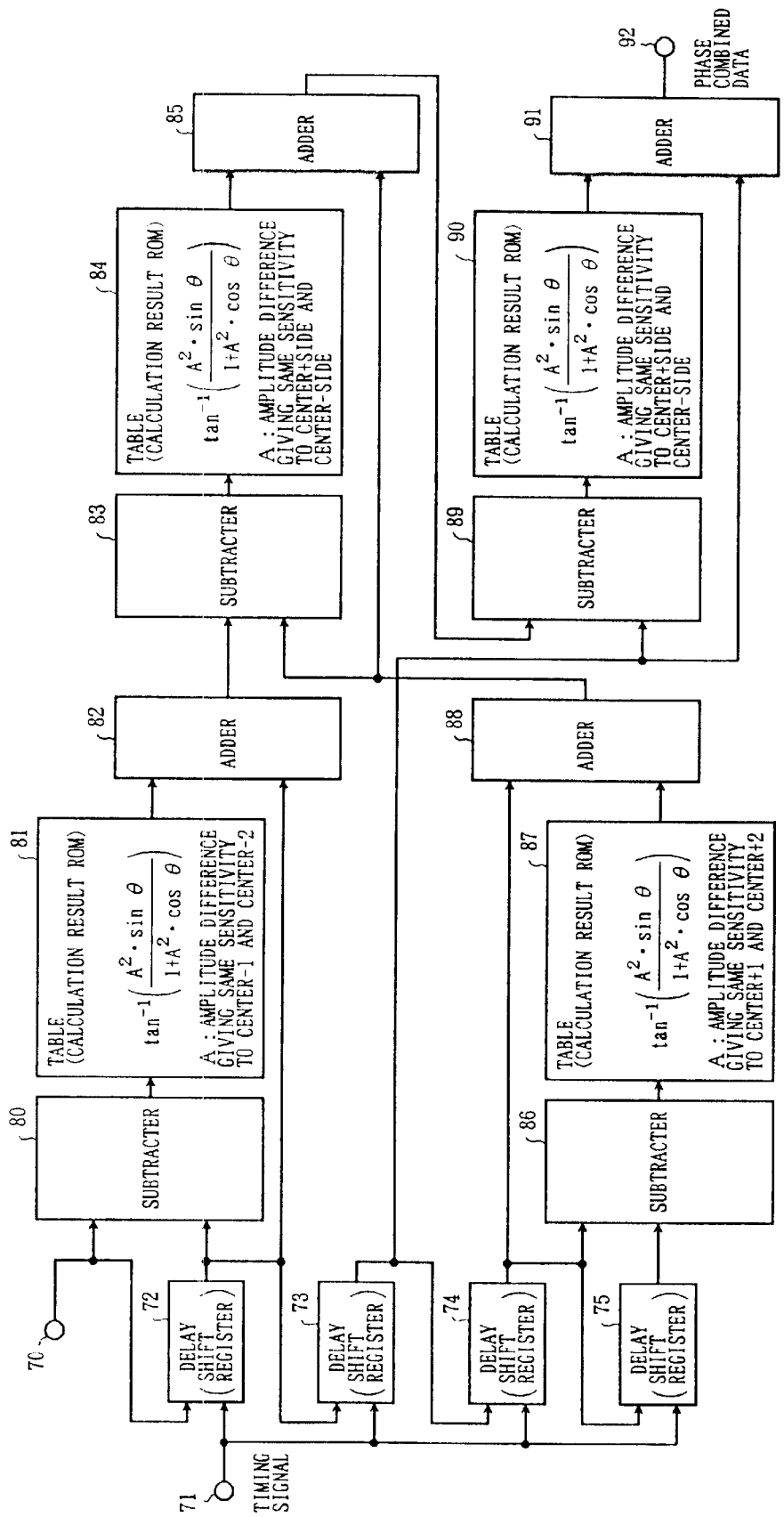
FIG. 9 shows one embodiment of the data processing circuit in the first system.

FIG. 9 shows a block diagram of one embodiment of the data processing circuit 26 in the above-described first system. In the figure, the quantized phase data, from the quantization circuit 22, is input to a terminal 70 and the timing signal, from the timing generation circuit 28, is input to a terminal 71. The input quantized phase data is successively shifted in delay elements 72 through 75, which constitute the shift register 50. The quantized phase signal, output from the delay element 73 at the moment when the quantized phase data sampled at the time of each rising edge of the reproduction clock signal of the symbol clock frequency is output from the delay element 73, is referred to as the center. The items of the quantized phase data output from the delay elements 74 and 75, respectively, are referred to as 'the center+1' and 'the center+2', respectively. The quantized phase data, output from the delay element 72 at the above-mentioned moment, is referred to as 'the center−1', and the quantized phase data input via the terminal 70, at the above-mentioned moment, is referred to as 'the center−2'.

A subtracter 80 performs subtraction of the quantized phase data of the center−1 and the center−2, and supplies the subtraction result θ to a table 81. In the table 81, phase differences, which are obtained from the following expression (1) for θ, are previously stored.

$$\tan^{-1}\left(\frac{A^2 \cdot \sin\theta}{1 + A^2 \cdot \cos\theta}\right) \quad (1)$$

In the expression (1), 'A' is a constant as the amplitude difference for giving the same sensitivity to the center−1 and the center−2.

In detail, the phase of the vector obtained from combination of a vector having a length $A_1$, a phase $\theta_1$ and a vector having a length $A_2$, a phase $\theta_2$ is obtained from the following expression (2):

$$\tan^{-1}\left(\frac{A_1 \cdot \sin\theta_1 + A_2 \cdot \sin\theta_2}{A_1 \cdot \cos\theta_1 + A_2 \cdot \cos\theta_2}\right) \quad (2)$$

In the expression (2), the four variables are included. Accordingly, the calculation of the expression (2) is complicated. Assuming that the ratio of the $A_1$ and $A_2$ as A and the difference between the $\theta_1$ and $\theta_2$ as θ, the phase $\theta_G$ of the combined vector is expressed by the following expression (3):

$$\theta_G = \theta_1 + \tan^{-1}\left(\frac{A^2 \cdot \sin\theta}{1 + A^2 \cdot \cos\theta}\right) \quad (3)$$

In the expression (3), two variables are included, and also, when the value of A increases to a certain value, the value of the phase difference is small. Therefore, the influence of A to $\theta_G$ is small. Accordingly, it is possible to limit the range of A. In the present embodiment, as the value of A, the amplitude for obtaining a level, at a phase deviated from the center, identical to the level at the center is considered. This is because the level at the center is the most clearly detected, and the influence of a level at a position deviated from the center in phase should be decreased in accordance with degradation of detection of the level at the deviated position. That is, the value of A is determined in consideration of the level at the phase deviated from the center. Based on the expression (3), the calculation of the expression (1) is performed.

The phase difference output from the table 81 is added to the quantized phase data of the center−1 in an adder 82 and vector combination is performed there. Then, the resulting data is supplied to a subtracter 83. The subtracter 86 performs subtraction of the quantized phase data of the center+1 and the center+2, and the subtraction result θ is supplied to a table 87. In the table 87, phase differences for θ, obtained from the expression (1), are previously stored. In the expression (1), in this case, 'A' is a constant as the amplitude difference for giving the same sensitivity to the center+1 and the center+2. The phase difference by the expression (1) is obtained from the table 87, and this phase difference is added to the quantized phase data of the center+1 output from the delay element 74 in an adder 88 and vector combination is performed there. Then, the resulting data is supplied to a subtracter 83.

The subtracter 83 performs subtraction of the quantized phase data of the outputs of the adders 82 and 88, and supplies the subtraction result θ to a table 84. In the table 84, phase differences obtained from the expression (1) for θ are previously stored. In the expression (1), in this case, 'A' is a constant as the amplitude difference for giving the same sensitivity to the center−side and the center+side. The phase difference by the expression (1) is obtained from the table 84, and this phase difference is added to the quantized phase data of the center+side, which the adder 88 outputs, and vector combination is performed, in an adder 85. Then, the resulting data is supplied to a subtracter 89.

The subtracter 89 performs subtraction of the quantized phase data of the outputs of the adder 85 and the delay element 73, and supplies the subtraction result θ to a table 90. In the table 90, phase differences obtained from the expression (1) for θ are previously stored. In the expression (1), in this case, 'A' is a constant as the amplitude difference for giving the same sensitivity to the center−side and the center+side. The phase difference by the expression (1) is obtained from the table 90, and this phase difference is added to the central quantized phase data output from the delay element 73 and vector combination is performed, in an adder 91. The resulting data is output via a terminal 92 as the combined phase data. The above-mentioned subtracters 80, 83, 86, 89 and the tables 81, 84, 87, 90 act as the phase difference detection circuit 53, and the adders 82, 85, 88, 91 act as the combination circuit 54.

In this embodiment, by using one item of the quantized phase data of items of the quantized phase data to be combined as a reference, the phase difference of the other item of the quantized phase data is obtained. Then, in accordance with the obtained phase difference, the phase difference after the combination is obtained with reference to the table. Then, by adding the phase difference after the combination to the quantized phase data used as the reference, as mentioned above, the combined phase difference is obtained. Thus, the precise combined phase difference can be obtained through simple calculations.

In this embodiment, the phase data of each symbol is obtained from combining a plurality of items of the quantized phase data which are sampled at a plurality of points, which include the center point and points before and after the center point, the center point being the point at the rising edge of the reproduction clock signal. Accordingly, even in a case where a sudden phase deviation occurs at one sampling point, or a case where the eye pattern is blurry, phase data with a small error can be obtained. Thereby, the number of errors occurring in the data determination can be reduced. In this embodiment, although the circuit scale is rather large, energy can be increased equivalently by combining respective signals, and thus, C/N can be improved and good characteristics can be obtained.

Figure 10:
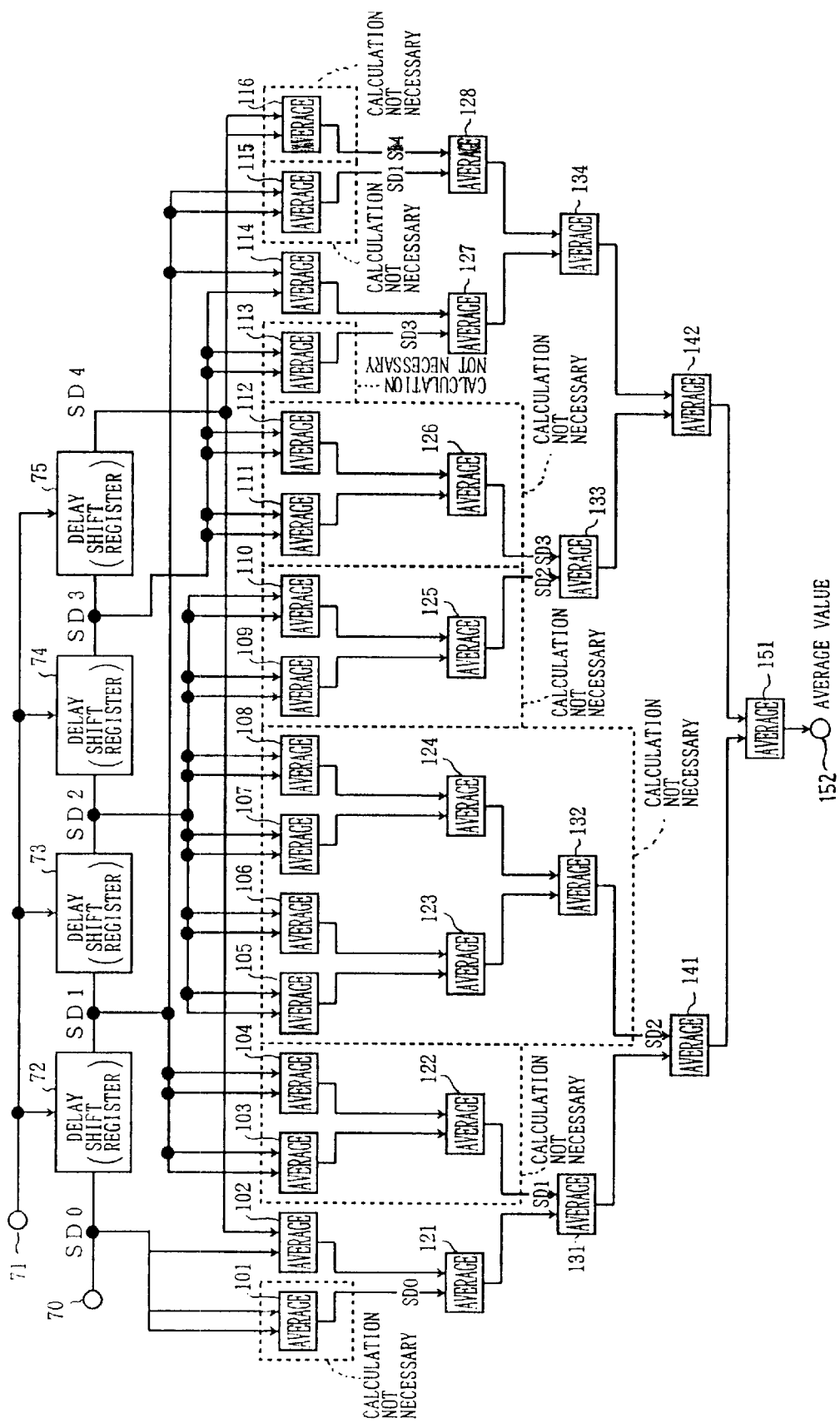
FIG. 10 shows one embodiment of the data processing circuit in the second system.

FIG. 10 shows a block diagram of one embodiment of the data processing circuit 26 in the above-mentioned second system. In the figure, the quantized phase data, from the quantization circuit 22, is input to a terminal 70 and the timing signal, from the timing generation circuit 28, is input to a terminal 71. The input quantized phase data is successively shifted in delay elements 72 through 75, which constitute the shift register 50. The quantized phase data, which is output from the terminal 70 at the moment when the quantized phase data sampled at each rising edge of the reproduction clock signal of the symbol clock frequency is output from the delay element 73, is referred to as SD0. The items of quantized phase data, which are output from the delay elements 72 through 75, respectively, at the above-mentioned moment, are referred to as SD1 through SD4, respectively.

An averaging circuit 101 averages the two items of the same quantized phase data SD0. An averaging circuit 102 averages the two items of the quantized phase data SD0 and SD4. Each of averaging circuits 103 and 104 averages the two items of the same quantized phase data SD1. Each of averaging circuits 105 through 110 averages the two items of the same quantized phase data SD2. Each of averaging circuits 111 through 113 averages the two items of the same quantized phase data SD3. An averaging circuit 114 averages the two items of the quantized phase data SD3 and SD4. An averaging circuit 115 averages the two items of the same quantized phase data SD1. An averaging circuit 116 averages the two items of the same quantized phase data SD4.

An averaging circuit 121 averages the quantized phase data of the outputs of the two averaging circuits 101 and 102. An averaging circuit 122 averages the quantized phase data of the outputs of the two averaging circuits 103 and 104. An averaging circuit 123 averages the quantized phase data of the outputs of the two averaging circuits 105 and 106. An averaging circuit 124 averages the quantized phase data of the outputs of the two averaging circuits 107 and 108. An averaging circuit 125 averages the quantized phase data of the outputs of the two averaging circuits 109 and 110. An averaging circuit 126 averages the quantized phase data of the outputs of the two averaging circuits 111 and 112. An averaging circuit 127 averages the quantized phase data of the outputs of the two averaging circuits 113 and 114. An averaging circuit 128 averages the quantized phase data of the outputs of the two averaging circuits 115 and 116.

An averaging circuit 131 averages the quantized phase data of the outputs of the two averaging circuits 121 and 122. An averaging circuit 132 averages the quantized phase data of the outputs of the two averaging circuits 123 and 124. An averaging circuit 133 averages the quantized phase data of the outputs of the two averaging circuits 125 and 126. An averaging circuit 134 averages the quantized phase data of the outputs of the two averaging circuits 127 and 128. An averaging circuit 141 averages the quantized phase data of the outputs of the two averaging circuits 131 and 132. An averaging circuit 142 averages the quantized phase data of the outputs of the two averaging circuits 133 and 134. An averaging circuit 151 averages the quantized phase data of the outputs of the two averaging circuits 141 and 142, and outputs the thus-obtained average as the combined phase data, via a terminal 152.

Here, because each of the averaging circuits 101, 103 through 113, 115, 116, 122 through 126 and 132 averages the two items of the same data, the calculation therefor is actually not necessary. In this embodiment, in the quantized phase data supplied to the averaging circuits 101 through 116, the number of items of the central quantized phase data SD2 supplied to the averaging circuits is large. Thus, a large weight is put on the quantized phase data SD2 of the center. The number of items of the quantized phase data, each of SD1 and SD3, near to the center, supplied to the averaging circuits, is reduced and thus the weight put thereon is reduced. The number of items of the quantized phase data, each of SD0 and SD4, far from the center, supplied to the averaging circuits, is further reduced and thus the weight put thereon is further reduced.

Thus, the phase data of each symbol is obtained from combining a plurality of items of the quantized phase data which are sampled at a plurality of points, which include the central point and points before and after the central point, the central point being a point at the rising edge of the reproduction clock signal. Accordingly, even in a case where a sudden phase deviation occurs at one sampling point, or a case where the eye pattern is blurry, phase data with a small error can be obtained. Thereby, the number of errors occurring in the data determination can be reduced. This embodiment has a circuit arrangement in which weighting is performed simply and flexibly.

Figure 11:
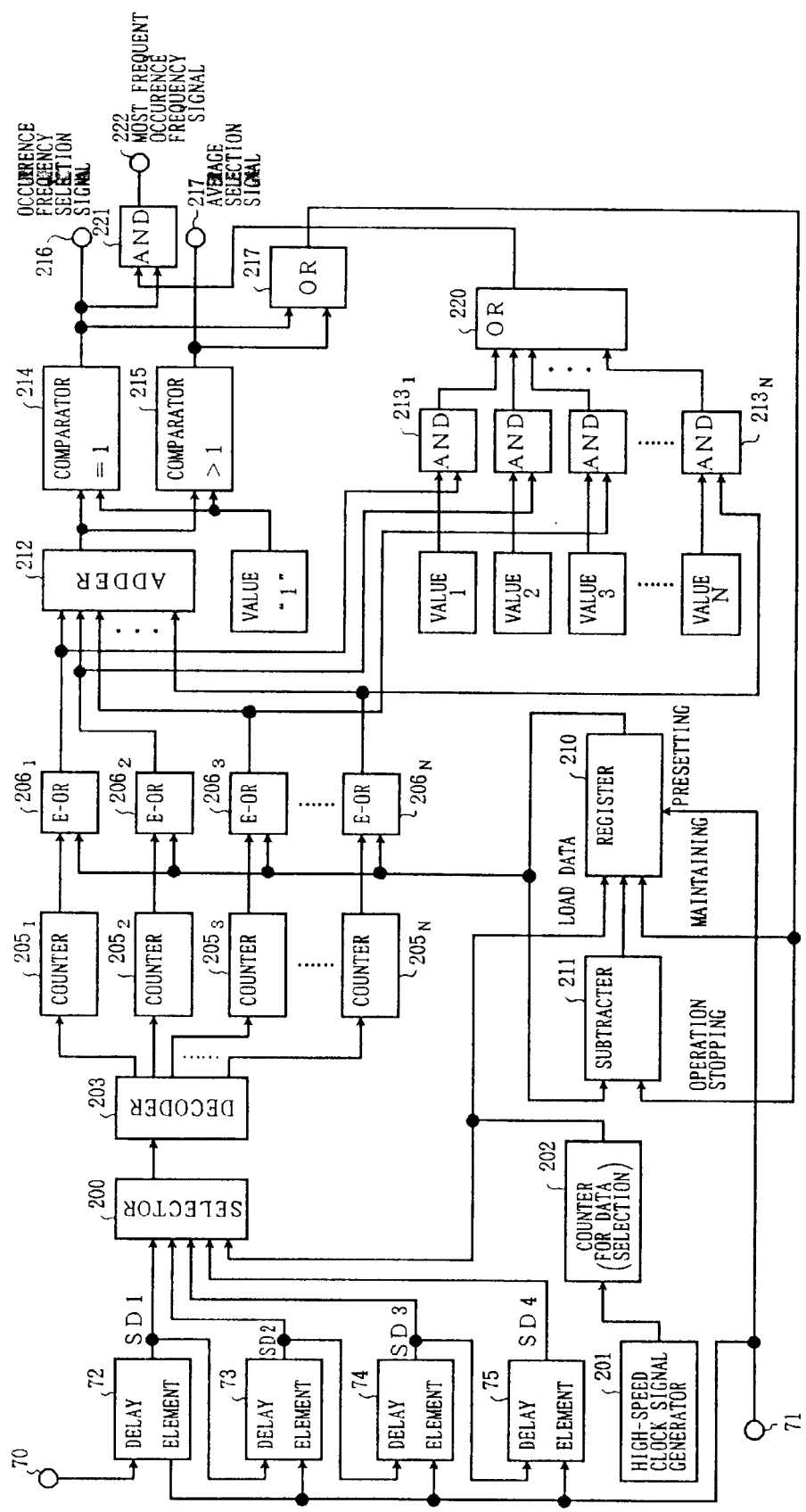
FIG. 11 shows one embodiment of the data processing circuit in the third system.

FIG. 11 shows a block diagram of one embodiment of the data processing circuit 26 in the above-mentioned third system. In the figure, the quantized phase data, from the quantization circuit 22, is input to a terminal 70 and the timing signal, from the timing generation circuit 28, is input to a terminal 71. The input quantized phase data is successively shifted in delay elements 72 through 75, which constitute the shift register 50. Here, the items of the quantized phase data, which are output from the delay elements 72 through 75, respectively, at the moment when the quantized phase data sampled at the time of each rising edge of the reproduction clock signal of the symbol clock frequency is output from the delay element 73, are referred to as SD1 through SD4, respectively. The quantized phase data SD1 through SD4 is supplied to a selector 200 constituting the occurrence frequency determination circuit 65.

A high-speed clock signal generator 201 generates a clock signal having a frequency four times the frequency of the reproduction clock signal and supplies the generated clock signal to a counter 202, in order to select one of the quantized phase data SD1 through SD4. The counter 202 is a quarternary counter, and supplies the count values 1 through 4 to the selector 200 in sequence. The selector 200 selects one of the quantized phase data SD1 through SD4, indicated by the count value supplied by the counter 202, and supplies the selected quantized phase data to the decoder 203.

The decoder decodes the supplied quantized phase data SD1 through SD4 in sequence, and supplies the value 1 to one of counters $205_1$ through $205_N$ via a terminal corresponding to the value of the quantized phase data, and supplies the value 0 to the remaining counters of the counters $205_1$ through $205_N$ via the other terminals. In this embodiment, the value of the quantized phase data is one of 0 through 32. Accordingly, N=33. Each of the counters $205_1$ through $205_N$ is reset at the moment of supply of the timing signal input via the terminal 71, and the count value thereof is incremented when the value 1 is supplied thereto. Each of the counters $205_1$ through $205_N$ outputs the count value to a respective one of exclusive OR circuits $206_1$ through $206_N$.

The count value which is the output of the counter 202 is preset in a register 210 at the moment of supply of the timing signal input via the terminal 71. Then, the preset value is decremented one by one by a subtracter 211. Thereby, the largest value of the output value of the register 210 is the count value output by the counter 202, and the output value of the register 210 is decremented one by one from the largest value. The output value of the register 210 is supplied to each of the exclusive OR circuits $206_1$ through $206_N$. When 'x' represents the delay time of each of the delay elements 72 through 75 and the 'y' represent the number of the delay elements 72 through 75, the decrementing period of the subtracter 211 is equal to or less than $x/(y+1)$.

Each of the exclusive OR circuits $206_1$ through $206_N$ outputs a signal of the value 1 only when the two inputs are the same as one another. The output value of each of the exclusive OR circuits $206_1$ through $206_N$ is supplied to an adder 212 and a respective one of AND circuits $213_1$ through $213_N$. The adder 212 add the thus-supplied values and supplies the addition result to each of comparators 214 and 215.

The value 1 is also supplied to each of the comparator 214 and 215. The comparator 214 generates an occurrence frequency selection signal of the value 1 and outputs this signal via a terminal 216 when the output of the adder 212 is 1. When the output of the adder 212 is larger than 1, the comparator 215 generates an average selection signal of the value 1 and outputs this signal via a terminal 217. In this arrangement, when the number of the counters of the counters $205_1$ through $205_N$, the count values of which are the same as the output value of the register 210, respectively, is 1, the occurrence frequency selection signal is output. When the number of the counters of the counters $205_1$ through $205_N$, the count values of which are the same as the output value of the register 210, respectively, is equal to or larger than 2, the average selection signal is output. The occurrence frequency selection signal and the average selection signal are supplied to the subtracter 211 and the register 210 through an OR circuit 217. As a result of the occurrence frequency selection signal and the average selection signal being supplied to the subtracter 211 and the register 210, the value of the register 210 is maintained, and the operation of the subtracter 210 is stopped.

The values 1 through N, which are the numbers the quantized phase value may have, are supplied to AND circuits $213_1$ through $213_N$, respectively. When each of the output values of one or some of the exclusive OR circuits $206_1$ through $206_N$ is 1, the values supplied to the AND circuits, respectively, to which the outputs of these exclusive OR circuits are supplied, respectively, are output from these AND circuits. The thus-output values are supplied to an AND circuit 221 via an OR circuit 220. When the occurrence frequency selection signal of the value 1 is supplied to the AND circuit 221, the AND circuit 221 outputs the supplied values as the combined phase data via a terminal 222. The circuit arrangement from the selector 200 to the AND circuit 221 constitute the frequency determination circuit 65.

In the above-described arrangement, when each of the quantized phase data SD1 through SD4 is '16', the count value of the counter $205_I$ (1<I<N) is 4, the output of the exclusive OR circuit $206_I$ is 1, and the output of the adder 212 is 1. Thereby, the occurrence frequency selection signal is output from the comparator 214, and the value '16' is output from the AND circuit $213_I$ and is output via the terminal 222. When the values of the quantized phase data SD1 through SD4 are '16, 16, 17, 17', the count value of the counter $205_I$ (1<I<N) is 2 and the count value of the counter $205_J$ (1<J<N) is 2. As a result, the output of each of the exclusive OR circuits $206_I$ and $206_J$ is 1, and thereby the output of the adder 212 is 2. As a result, the average selection signal is output and the value output from each of the AND circuits $203_I$ and $203_J$ is not output via the terminal 222.

Thus, the phase data of each symbol is obtained from combining a plurality of items of the quantized phase data which are sampled at a plurality of points, which include the central point and points before and after the central point, the central point being the point at the rising edge of the reproduction clock signal. Accordingly, even in a case where a sudden phase deviation occurs at one sampling point, or a case where the eye pattern is blurry, phase data with a small error can be obtained. Thereby, the number of errors occurring in the data determination can be reduced. This embodiment can be embodied by a small scale circuit, and quality degradation due to addition of this circuit is low. Further, by increasing the number of items of the quantized phase data sampled to be used for the occurrence frequency determination, the performance of the data processing circuit 26 can be further improved.

Figure 12:
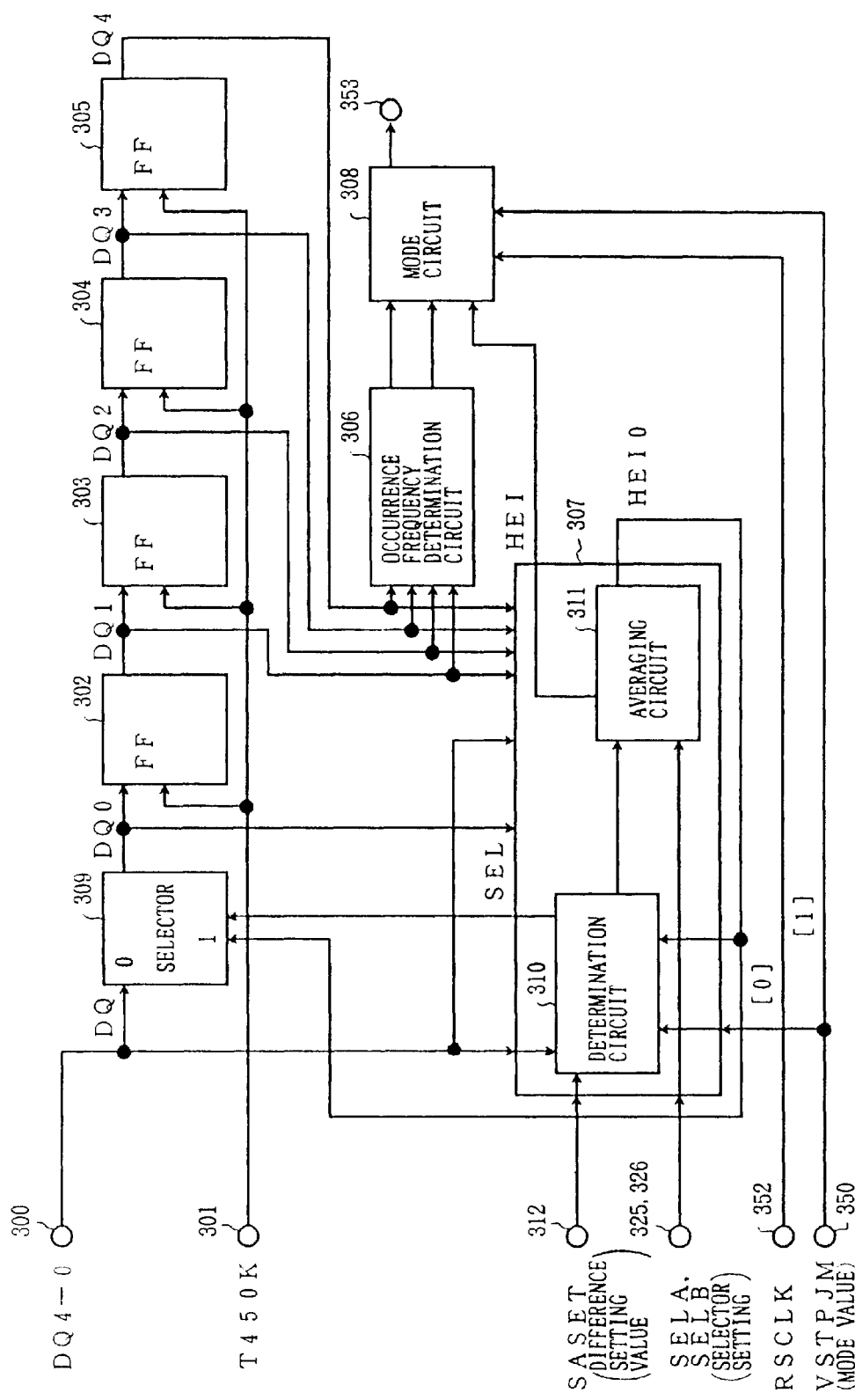
FIG. 12 shows a block diagram of one embodiment of the data processing circuit obtained from combining the second system and third system.

FIG. 12 shows a block diagram of one embodiment of the data processing circuit 26 obtained from combining the above-described second system and third system. In the figure, via a terminal 300, the quantized phase data is supplied from the quantization circuit 22, and, via a terminal 301, the timing signal is supplied from the timing generation circuit 28. The quantized phase data is supplied, via a selector 309, to delay elements 302 through 305 which constitute the shift register 50. The supplied quantized phase data is successively shifted in the delay elements 302 through 305.

Here, the quantized phase data input via the terminal 300 at the moment when the quantized phase data sampled at the time of each rising edge of the reproduction clock signal of the symbol clock frequency is output from the delay element 303 is referred to as DQ, the quantized phase data input to the delay element 302 at the above-mentioned moment is referred to as DQ0, and the quantized phase data, output from the delay elements 302 through 305, respectively, at the above-mentioned moment, are referred to as DQ1 through DQ4, respectively. The quantized phase data DQ, DQ1 through DQ4 are supplied to an occurrence frequency determination circuit 306 and a determination and averaging circuit 307. The occurrence frequency determination circuit 306 has an arrangement the same as the arrangement shown in FIG. 11. The occurrence frequency selection signal, average selection signal and combined phase data are supplied to a mode circuit 308.

A determination circuit 310 in the determination and averaging circuit 307 compares the average of the quantized phase data supplied from an averaging circuit 311 with the latest quantized phase data DQ. Then, only when the difference between this average and the latest quantized phase data DQ is larger than a set value SUBSET which is supplied via a terminal 312, the determination circuit 310 outputs a control signal of the value 1. The determination circuit 310 outputs the control signal of the value 0 in the other cases. The control signal is supplied to the selector 309 and the averaging circuit 311. When this control signal is 0, the selector 309 outputs the latest quantized phase data DQ as DQ0. When this control signal is 1, that is, when the reliability of the quantized phase data DQ is low, the selector 309 outputs the average of the quantized phase data, supplied from the averaging circuit 311, as DQ0, instead of the latest quantized phase data DQ.

Figure 13:
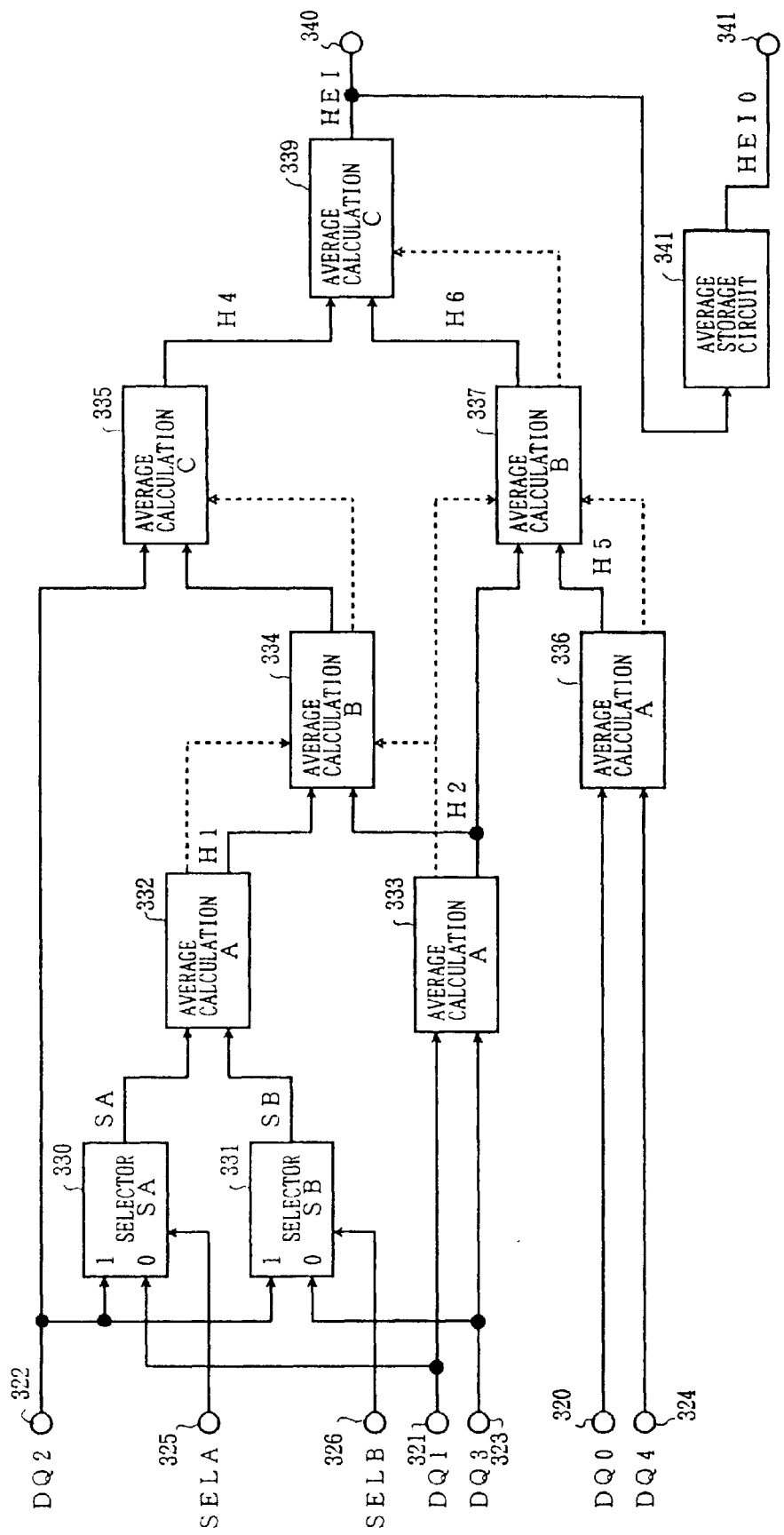
FIG. 13 shows a block diagram of another embodiment of the data processing circuit in the second system.

The averaging circuit 311 has an arrangement shown in FIG. 13. This arrangement is also another embodiment of the second system. In FIG. 13, the quantized phase data DQ0 through DQ4 are supplied to terminals 320 through 324, respectively. Control signals SELA and SELB for changing weighting are supplied to terminals 325 and 326, respectively. A selector 330 selects the quantized phase data DQ2 when the control signal SELA is 1, and selects the quantized phase data DQ1 when the control signal SELA is 0. The thus-selected quantized phase signal is supplied to an average calculation circuit 332. A selector 331 selects the quantized phase data DQ2 when the control signal SELB is 1, and selects the quantized phase data DQ3 when the control signal SELB is 0. The thus-selected quantized phase signal is supplied to the average calculation circuit 332. The selection by the selectors 330 and 331 change the weighting so as to change which item of the quantized phase data is an item of the quantized phase data, the weight put thereon being to be heavy.

The averaging calculation circuit 332 averages the quantized phase data supplied from the selectors 330 and 331, and supplies the resulting average to an average calculation circuit 334. An average calculation circuit 333 averages the quantized phase data DQ1 and DQ3, and supplies the resulting average to average calculation circuits 334 and 337. The average calculation circuit 334 averages the quantized phase data of the outputs of the average calculation circuits 332 and 333, and supplies the resulting average to an average calculation circuit 335. The average calculation circuit 335 averages the output of the average calculation circuit 334 and the quantized phase data DQ2, and supplies the resulting average to an average calculation circuit 339.

An average calculation circuit 336 averages the quantized phase data DQ0 and DQ4, and supplies the resulting average to an average calculation circuit 337. The average calculation circuit 337 averages the quantized phase data of the outputs of the average calculation circuits 333 and 336, and supplies the resulting average to an average calculation circuit 339. The average calculation circuit 339 averages the quantized phase data of the outputs of the average calculation circuits 335 and 337, and outputs the resulting average via a terminal 340 as the combined phase data.

Each of the average calculation circuits 332, 333, 336 and 337 outputs a mask signal when the phase difference between the two supplied items of quantized phase data is 180 degrees. When the mask signal is supplied, each of the averaging calculation circuits 334, 335, 337 and 339 outputs, as the average, the quantized phase data, which has been supplied from the average calculation circuit which has not supplied the mask signal. When the mask signal is supplied from the two average calculation circuits as the two inputs, respectively, each of the averaging circuit 334 and 337 outputs the mask signal. The above-described operations of the average calculation circuits are performed so that, when noise enters into the averaging circuit 311, the influence of the noise is removed.

The combined phase data is output via the terminal 340, and also, is supplied to an average storage circuit 341. The average storage circuit 341 stores the combined phase data from the average calculation circuit 339 and outputs the combined phase data via a terminal 314, at the moment of supply of the timing signal supplied via a terminal 341.

With reference to FIG. 12, the combined phase data output from the terminal 340 of the averaging circuit 311 is supplied to the mode circuit 308, and the stored combined phase data output from the terminal 341 is supplied to the selector 309. The mode circuit 308 outputs, via a terminal 353, the combined phase data supplied from the occurrence frequency determination circuit 306 or the averaging circuit 311 in accordance with a mode signal supplied via a terminal 350, in synchronization with a clock signal supplied via a terminal 352.

In a normal mode, when the occurrence frequency selection signal is supplied from the occurrence frequency determination circuit 306, the mode circuit 308 outputs the combined phase data supplied from the occurrence frequency determination circuit 306, via the terminal 353. When the average selection signal is supplied from the occurrence frequency determination circuit 306, the mode circuit 308 outputs the combined phase data supplied from the averaging circuit 311, via the terminal 353. Thus, when the occurrence frequency of the quantized phase data having the same value is high, this quantized phase data is determined to be normal and is output. When the occurrence frequency of the quantized phase data having the same value is low, the quantized phase data is averaged and the resulting average is output. Thereby, the influence of noise or the like is reduced.

In this embodiment, in particular even in a case where a sudden phase deviation occurs at one sampling point due to noise or the like, erroneous data determination can be prevented. Even in a case where the sampled plurality of the quantized phase data includes a plurality of items of different quantized phase data, each of which occurs most frequently, the phase data of each symbol can be easily obtained from combining the plurality of items of the quantized phase data.

Figure 14:
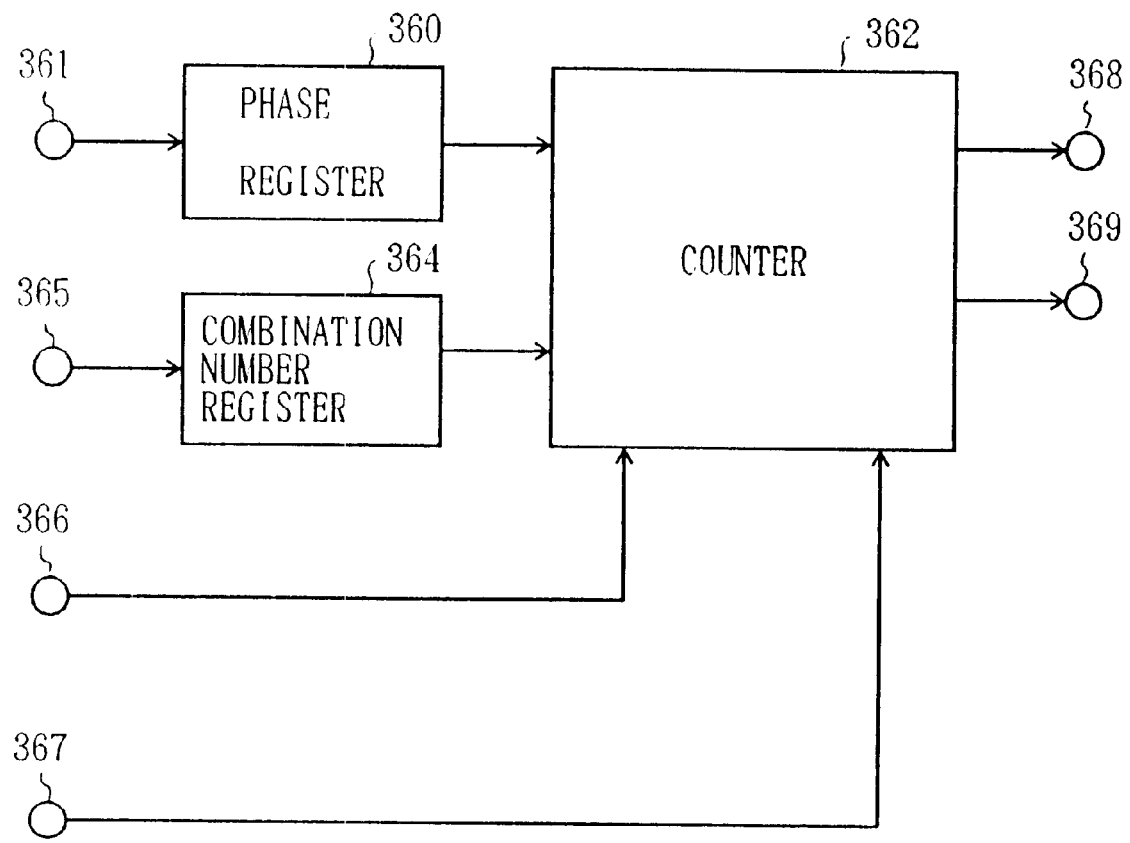
FIG. 14 shows a block diagram of one embodiment of a timing generation circuit used in the circuit shown in FIG. 3.

FIG. 14 shows a block diagram of one embodiment of the timing generation circuit 28. In the figure, in a phase register 360, the phase value indicating the phase difference of the quantized phase data at the center at each rising edge of the reproduction clock signal is set via a terminal 361. The set phase value is supplied to a counter 362. In a combination number register 364, a combination number is set via a terminal 365. The combination number indicates the number of items of the quantized phase data to be combined, and is input from a control circuit (not shown in the figure). The combination number is supplied to the counter 362.

Further, the reproduction clock signal is supplied to the counter 362 via a terminal 366, and a clock signal of a frequency, for example, 14.4 MHz, is supplied to the counter 362 via a terminal 367. The counter 362 determines, as the center, the time which is obtained from shifting from each rising edge of the reproduction clock signal by the phase of the above-mentioned phase value. Then, the counter 362 generates the combination number of pulses of the frequency, 450 kHz, which pulses occur at the above-mentioned center, before the center and after the center. The counter 362 supplies these pulses, as the timing signal, to the data processing circuit 26 via a terminal 368. Further, the counter 362 supplies the pulse occurring at the above-mentioned center to the sampling circuit 30 via a terminal 369.

In the above-described embodiments, only the case of detection of a four-phase PSK signal has been described. However, it is not necessary to be limited to the above-mentioned embodiments. The present invention can also be applied to a detection circuit of a digital radio communication apparatus for an eight phase or sixteen phase PSK signal, or the like.

Further, the present invention is not limited to the above-described embodiments, and variations and modifications may be made without departing from the scope of the present invention.

What is claimed is:

1. A detection method of a digital radio communication apparatus which receives a PSK modulated signal, said method comprising the steps of:

a) combining a plurality of items of quantized data with respect to a timing defined by a reproduced clock signal so that combined phase data can be generated for each symbol; and b) determining data from the combined phase data.

2. The detection method of the digital radio communication apparatus according to claim 1, wherein the plurality of items of quantized data with respect to the timing defined by the reproduced clock signal are a plurality of items of quantized data sampled in discrete timings of the periods of the PSK modulated signal.

3. The detection method of the digital radio communication apparatus according to claim 2, wherein said step a) is performed by detecting the phase difference between two adjacent items of the plurality of items of quantized data and performing vector combination using the detected phase difference.

4. The detection method of the digital radio communication apparatus according to claim 2, wherein said step a) is performed by averaging the plurality of items of quantized data after weighting the plurality of items of quantized data so that the weight put on the item of quantized data is reduced as the timing thereof is spaced from the timing defined by the reproduced clock signal.

5. The detection method of the digital radio communication apparatus according to claim 2, wherein said step a) is performed by determining, as the combined phase data, the item of the quantized data of the plurality of items of the quantized data, which occurs most frequently.

6. The detection method of the digital radio communication apparatus according to claim 5, wherein said step a) is performed by averaging the plurality of items of quantized data after weighting the plurality of items of quantized data so that the weight put on the item of quantized data is reduced as the timing thereof is spaced from the timing defined by the reproduced clock signal, when the plurality of items of quantized data includes a plurality of items of different quantized data, each of which occurs most frequently.

7. A detection circuit of a digital radio communication apparatus, which receives a PSK modulated signal, comprising:

combining means for combining a plurality of items of quantized data with respect to a timing defined by a reproduced clock signal so that combined phase data can be generated for each symbol; and determining means for determining data from the combined phase data.

8. The detection circuit of the digital radio communication apparatus according to claim 7, wherein the plurality of items of quantized data with respect to the timing defined by the reproduced clock signal are a plurality of items of quantized data sampled in discrete timings of the periods of the PSK modulated signal.

9. The detection circuit of the digital radio communication apparatus according to claim 8, wherein said combining means comprises:

phase difference detecting means for detecting the phase difference between two adjacent items of the plurality of items of quantized data; and vector combining means for performing vector combination using the detected phase difference.

10. The detection circuit of the digital radio communication apparatus according to claim 8, wherein said combining means comprises weighting and averaging means for averaging the plurality of items of quantized data after weighting the plurality of items of quantized data so that the weight put on the item of quantized data is reduced as the timing thereof is spaced from the timing defined by the reproduced clock signal.

11. The detection circuit of the digital radio communication apparatus according to claim 8, wherein said combining means comprises occurrence frequency determining means for determining, as the combined phase data, the item of the quantized data of the plurality of items of the quantized data, which occurs most frequently.

12. The detection circuit of the digital radio communication apparatus according to claim 11, wherein said combining means comprises weighting and averaging means for averaging the plurality of items of quantized data after weighting the plurality of items of quantized data so that the weight put on the item of quantized data is reduced as the timing thereof is spaced from the timing defined by the reproduced clock signal, when the plurality of items of quantized data includes a plurality of items of different quantized data, each of which occurs most frequently.

13. A detection circuit of a digital radio communication apparatus, which receives a PSK modulated signal, comprising:

a combination circuit which combines a plurality of items of quantized data with respect to a timing defined by a reproduced clock signal so that combined phase data can be generated for each symbol; and a determination circuit which determines data from the combined phase data.

14. The detection circuit of the digital radio communication apparatus according to claim 13, wherein the plurality of items of quantized data with respect to the timing defined by the reproduced clock signal are a plurality of items of quantized data sampled in discrete timings of the periods of the PSK modulated signal.

15. The detection circuit of the digital radio communication apparatus according to claim 14, wherein said combination circuit comprises:

a phase difference detection circuit which detects the phase difference between two adjacent items of the plurality of items of quantized data; and a vector combination circuit which performs vector combination using the detected phase difference.

16. The detection circuit of the digital radio communication apparatus according to claim 14, wherein said combination circuit comprises a weighting and averaging circuit which averages the plurality of items of quantized data after weighting the plurality of items of quantized data so that the weight put on the item of quantized data is reduced as the timing thereof is spaced from the timing defined by the reproduced clock signal.

17. The detection circuit of the digital radio communication apparatus according to claim 14, wherein said combination circuit comprises an occurrence frequency determination circuit which determines, as the combined phase data, the item of the quantized data of the plurality of items of the quantized data, which occurs most frequently.

18. The detection circuit of the digital radio communication apparatus according to claim 17, wherein said combination circuit comprises a weighting and averaging circuit which averages the plurality of items of quantized data after weighting the plurality of items of quantized data so that the weight put on the item of quantized data is reduced as the timing thereof is spaced from the timing defined by the reproduced clock signal, when the provided plurality of items of quantized data includes a plurality of items of different quantized data, each of which occurs most frequently.

* * * * *